(12) United States Patent
Kerselaers et al.

(10) Patent No.: US 10,917,773 B1
(45) Date of Patent: Feb. 9, 2021

(54) NEAR-FIELD WIRELESS DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/839,086

(22) Filed: Apr. 3, 2020

(51) Int. Cl.
*H04B 5/00* (2006.01)
*H04B 17/20* (2015.01)
*H01Q 7/00* (2006.01)
*H01Q 1/24* (2006.01)
*G01R 29/10* (2006.01)
*H04W 4/80* (2018.01)
*H04B 5/02* (2006.01)

(52) U.S. Cl.
CPC ............. *H04W 4/80* (2018.02); *H04B 5/02* (2013.01)

(58) Field of Classification Search
None
See application file for complete search history.

(56) References Cited

U.S. PATENT DOCUMENTS

| | | | |
|---|---|---|---|
| 8,274,386 B1 * | 9/2012 | Dea .................... | G01V 3/101 340/561 |
| 8,483,632 B2 * | 7/2013 | Asrani ............... | H04W 52/245 455/117 |
| 8,710,966 B2 | 4/2014 | Hill | |
| 8,866,760 B2 * | 10/2014 | Corroy ................ | H04B 13/005 345/173 |
| 8,970,501 B2 | 3/2015 | Hotelling et al. | |
| 9,083,074 B2 * | 7/2015 | Ayatollahi .......... | H04B 7/0602 |
| 9,143,199 B2 * | 9/2015 | Bangs ................. | G06K 7/10237 |
| 9,485,034 B2 * | 11/2016 | Bolin ................... | H04W 4/80 |
| 9,564,676 B2 * | 2/2017 | Black .................. | H01Q 5/335 |
| 9,584,191 B2 * | 2/2017 | Hamilton ............ | H03H 7/40 |
| 9,791,490 B2 * | 10/2017 | Pascolini ............ | G01R 29/10 |
| 9,794,670 B2 * | 10/2017 | Rodzevski .......... | H04B 13/005 |
| 9,794,733 B2 * | 10/2017 | Bengtsson .......... | H04W 4/80 |
| 9,804,712 B2 * | 10/2017 | Fergusson .......... | G06F 3/03 |
| 9,825,364 B2 * | 11/2017 | O'Driscoll .......... | H01Q 7/005 |
| 9,876,276 B2 * | 1/2018 | Bengtsson .......... | H01Q 9/30 |
| 9,881,277 B2 | 1/2018 | Brady | |
| 9,966,667 B2 * | 5/2018 | Ayala Vazquez ... | H01Q 1/245 |

(Continued)

OTHER PUBLICATIONS

U.S. Appl. No. 16/545,207; Not Yet Published; 37 pages (filed Aug. 20, 2019).

(Continued)

*Primary Examiner* — Tuan A Tran (57) ABSTRACT

One example discloses a near-field wireless device, including: a near-field antenna having a first conductive surface and a second conductive surface; wherein the conductive surfaces are configured to carry non-propagating quasi-static near-field electro-induction (NFEI) signals; a tuning circuit coupled to the near-field antenna and having a set of tuning parameters; a controller coupled to the tuning circuit; wherein the controller is configured to monitor a loading of the near-field antenna; wherein the controller is configured to adjust the tuning parameters if the loading is different from a preselected loading; and wherein the controller is configured to set a user present status in response to a predefined threshold change in the set of tuning parameters.

19 Claims, 5 Drawing Sheets

(56) References Cited

U.S. PATENT DOCUMENTS

| | | | |
|---|---|---|---|
| 10,056,695 B2 * | 8/2018 | Ayala Vazquez | H01Q 1/245 |
| 10,277,284 B1 * | 4/2019 | Kerselaers | H04B 5/0031 |
| 10,381,715 B2 * | 8/2019 | Han | H01Q 5/328 |
| 10,468,756 B2 * | 11/2019 | Han | H01Q 13/106 |
| 10,554,240 B2 * | 2/2020 | Han | H04B 17/102 |
| 10,571,502 B2 * | 2/2020 | Pascolini | G01R 29/10 |
| 10,601,467 B1 * | 3/2020 | Gomme | H04W 12/06 |
| 2016/0320910 A1 | 11/2016 | Fang et al. | |

OTHER PUBLICATIONS

U.S. Appl. No. 16/752,403; not yet published; 35 pages (filed Jan. 24, 2020).

* cited by examiner

NEAR-FIELD WIRELESS DEVICE

The present specification relates to systems, methods, apparatuses, devices, articles of manufacture and instructions for near-field wireless devices.

SUMMARY

According to an example embodiment, a near-field wireless device, comprising: a near-field antenna having a first conductive surface and a second conductive surface; wherein the conductive surfaces are configured to carry non-propagating quasi-static near-field electro-induction (NFEI) signals; a tuning circuit coupled to the near-field antenna and having a set of tuning parameters; a controller coupled to the tuning circuit; wherein the controller is configured to monitor a loading of the near-field antenna; wherein the controller is configured to adjust the tuning parameters if the loading is different from a preselected loading; and wherein the controller is configured to set a user present status in response to a predefined threshold change in the set of tuning parameters.

In another example embodiment, the loading corresponds to an operational resonance frequency and/or an operational bandwidth of the near-field antenna; and the controller is configured to adjust the tuning parameters if the operational resonance frequency is different from a preselected resonance frequency and/or the operational bandwidth is different from a preselected bandwidth.

In another example embodiment, the tuning parameters include a capacitance or a resistance; and the controller is configured to set the user present status in response to a decrease in the capacitance and/or the resistance.

In another example embodiment, the tuning parameters include a capacitance or a resistance; and the controller is configured to clear or reset the user present status in response to an increase in the capacitance or the resistance.

In another example embodiment, the user is a person.

In another example embodiment, the user is at least one of: a robot, a vehicle, a docking system, a physical coupling system, or a tool or storage station on an assembly line.

In another example embodiment, the user present status corresponds to at least one of: the user holding the wireless device, the user grasping the wireless device, the user attaching the wireless device to their body, or the user has taken exclusive possession of the wireless device.

In another example embodiment, the first and second conductive surfaces are embedded in at least one of: a vehicle, a game controller, an amusement park ride, a medical device, an industrial station, or a robotic device.

In another example embodiment, the first and second conductive surfaces are configured to be capacitively coupled to the user.

In another example embodiment, a first capacitance between the first conductive surface and a first user surface is at least $\frac{1}{10}^{th}$ of a second capacitance between the second conductive surface and a second user surface.

In another example embodiment, the controller is configured to monitor the resonance frequency or the bandwidth when the wireless device is configured to receive the near-field signals.

In another example embodiment, the controller is configured to monitor the resonance frequency or the bandwidth when the wireless device is configured to transmit the near-field signals.

In another example embodiment, the controller is configured to set and/or reset the user present status independent from any externally received wired or wireless signal.

In another example embodiment, the wireless device is a gaming controller; the first conductive plate is on one side of the game controller; and the second conductive plate is on a diametrically opposite side of the game controller.

In another example embodiment, the first conductive plate is configured to face a palm of the user's hand; and the second conductive plate is configured to face a set of fingers of the user's hand.

In another example embodiment, further comprising a second near-field device having a same set of elements as the first wireless device; wherein the first and second wireless devices are first and second gaming devices; and wherein the controller is configured to pair the first and second gaming devices if both devices have set the user present status.

In another example embodiment, the first and second wireless devices establish a near-field communications link if both devices have set the user present status.

In another example embodiment, the controller is configured to output an authentication signal if both the user present status and the set of tuning parameters corresponds to a stored set of tuning parameters.

In another example embodiment, wherein the authentication signal at least one of: activates an electronic device, permits entry to a secure space, indicates that a procedure has been correctly followed, and/or indicates that a quality assurance procedure has been performed, and/or unlocks a user interface on a gamming device.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between a near-field device on a user's body, for example, and other conductive surfaces and/or other wireless networked devices (e.g. Internet of Things (IoT) devices) based on either near-field electromagnetic induction (NFEMI), where the transmitter and receiver are coupled by both magnetic (H) and electric (E) fields, or near-field electrostatic induction (NFEI), where the transmitter and receiver are coupled by just electric (E) fields. While RF wireless communication is accomplished by propagating an RF plane wave through free space, NFEMI and NFEI communication utilizes non-propagating quasi-static H and/or E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some body held or worn devices, such as game controllers, medical devices, hearing aids and wireless earbuds, may also employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation.

Other body held or worn devices employ Near-field Electric Induction (NFEI)) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

In various contexts, detecting when multiple near-field devices are being held as a precondition for NFEMI or other communications is important. For example, as gaming becomes more and more popular, some players interact with multiple devices, such as two game controllers one for each hand, to enable gaming engagement, displaying player results on a console or screen, and so on.

Often multiple gaming players are in a common physical area and take turns exchanging, reusing the same gaming devices. Thus these devices are preferably quickly assigned to a new player (e.g. <10 ms). Existing RF technologies, such as Bluetooth operating with far fields in the 2.5 GHz industrial and scientific frequency band, however, require a relative long pairing time (e.g. >several seconds). Also since users typically hold such gaming devices inside their hand, such RF antenna's communications performance may be severely impacted since the user's hand substantially encloses these RF antennas.

Now discussed are near-field based wireless devices for detecting a user's possession of the device (e.g. holding, grasping, attaching, etc.), enabling quick pairing, preventing too much signal degradation.

Figure 1:
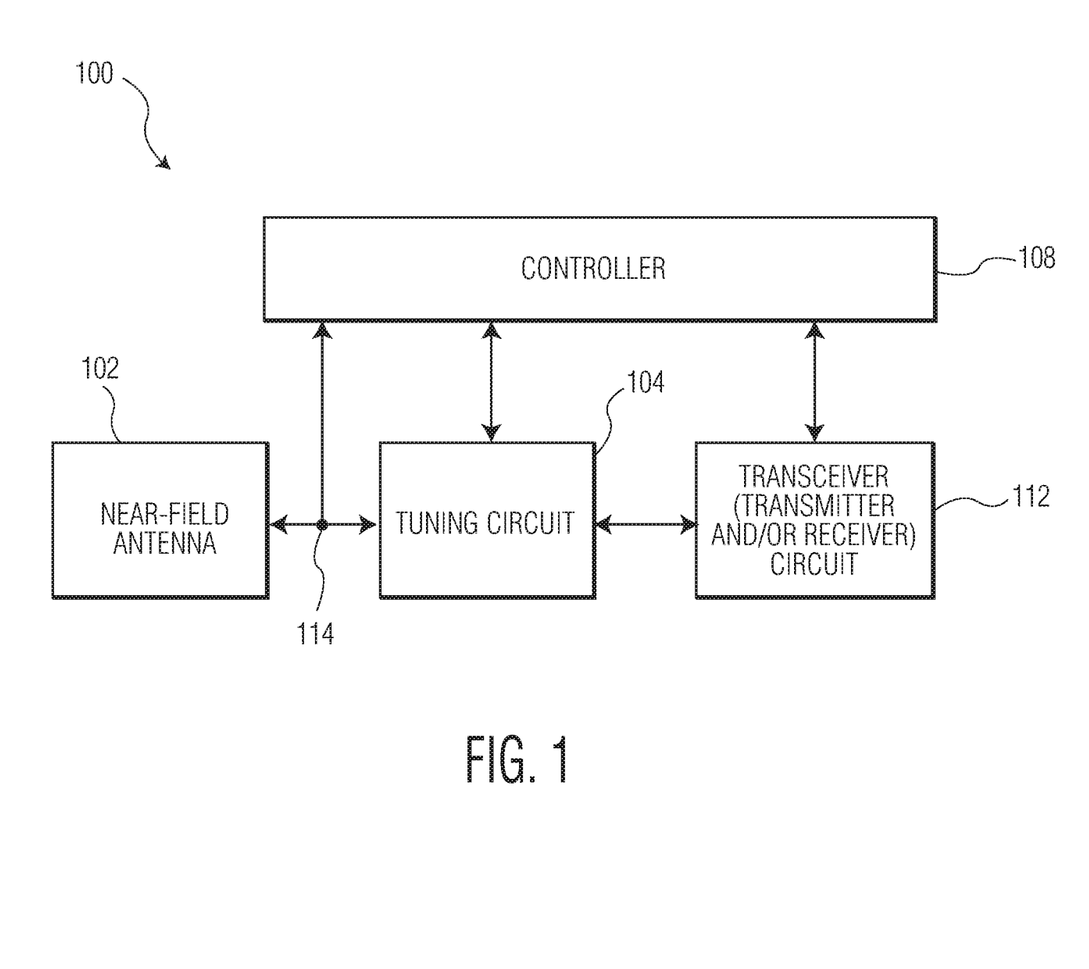
FIG. 1 is an example of a near-field wireless device.

FIG. 1 is an example of a near-field wireless device 100. The example near-field wireless device 100 includes a near-field antenna 102, a tuning circuit 104, a controller 108 and a transceiver circuit 112. An example of the near-field antenna 102 is presented and discussed in FIGS. 2A and 2B.

The controller 108 is configured to monitor and maintain the device's 100 operational resonance frequency and operational bandwidth/quality factor of the near-field signals (e.g. NFEI or NFEMI) carried by the near-field antenna. The controller 108 is configured to adjust the tuning parameters if either the operational resonance frequency is different from a preselected resonance frequency and/or the operational bandwidth is different from a preselected bandwidth.

The tuning circuit 104 is configured to adjust the device's 100 resonance frequency using a capacitive bank (C-bank), and bandwidth using a resistive bank (R-bank) in response to signals from the controller 108. The C-bank and R-bank discretes are in some examples about 130 pF and 5000 ohms respectively to support the required resonance frequency (e.g. 10.6 MHz) and bandwidth (e.g. 400 KHz). The controller 108 is configured to adjust (e.g. increment/decrement) the C-bank and R-bank values using the tuning circuit 104.

Based on these adjustments of the tuning parameters, that the controller 108 sends to the tuning circuit 104, the controller 108 is configured to set a user present status in response to a first predefined threshold change (e.g. in response to a decrease in a capacitance and/or a resistance) in the set of tuning parameters. The controller 108 is configured to clear/reset the user present status in response to a second predefined threshold change (e.g. in response to an increase in the capacitance and/or the resistance) in the set of tuning parameters.

User present status is herein defined to include at least the following: a user holding the device 100, a user grasping the device 100, a user attaching the device 100 to their body, and/or other indicators that the user has taken exclusive possession of the device 100.

Note, while example embodiments discussed herein refer to a "user", in alternate embodiments the near-field device 100 can be taken exclusive possession of by other items, entities, etc. such as by: a robot, a vehicle, a docking system, a physical coupling system, a station on an assembly line, and so on.

In other example embodiments, the transceiver circuit 112 is configured to inject test signals (e.g. three test signals) into the tuning circuit 104 and the antenna 102. The controller 108 is then configured to: first, monitor a loading of the near-field antenna 102; second, adjust the tuning parameters if the loading is different from a preselected loading; and third, set the user present status in response to a predefined threshold change in the set of tuning parameters. Both the tuning circuit 104 variations and/or the loading variations are in response to a user interacting with the wireless device 100.

Figure 2A:
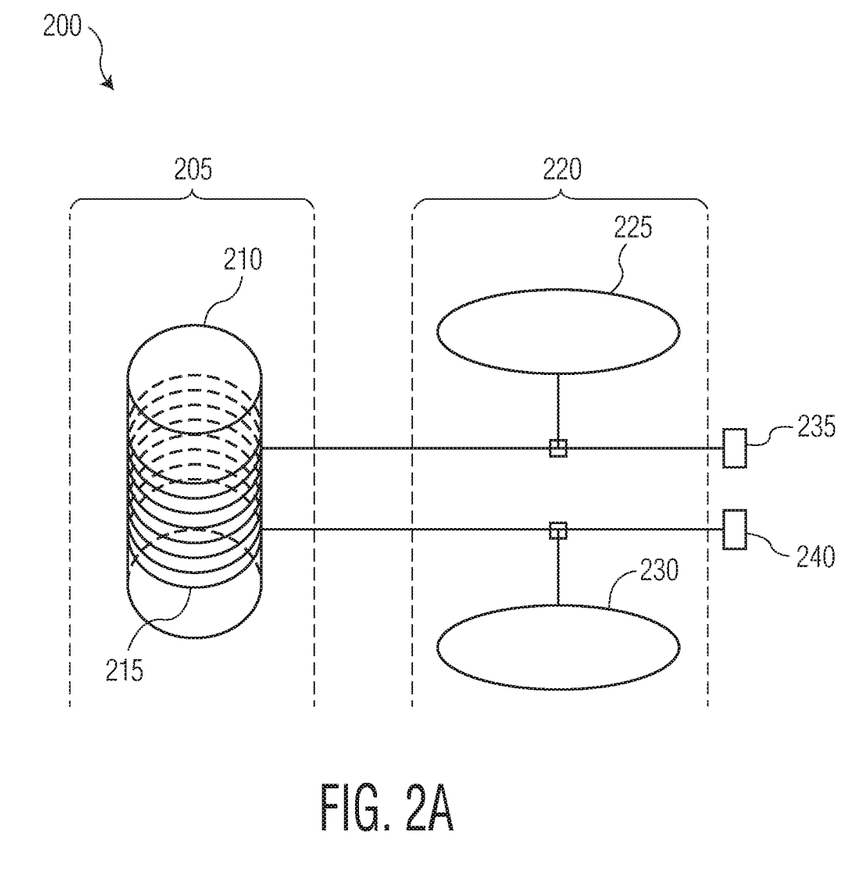
FIG. 2A is a first example near-field antenna in the wireless device.

FIG. 2A is a first example 200 near-field antenna in the wireless device 100. In this example the antenna 200 is a near-field electromagnetic induction (NFEMI) antenna. In some example embodiments, the antenna 200 includes a coil (H-field) antenna 205 for magnetic fields, in conjunction with a short loaded dipole (E-field) antenna 220 for electric fields. The H-field antenna 205 includes a ferrite core 210 wound with wire 215. The E-field antenna 220 includes two conductive loading surfaces 225 and 230. Antenna 200 feed points 235, 240 are coupled to various transceiver circuitry, such as a downstream radio transmitter and receiver integrated circuit (RF-IC), (not shown here). The antenna 200 can be tuned to resonate at a communication frequency by means of reactance components that are integrated in the RF-IC. The antenna's 200 bandwidth can similarly be tuned using the reactance components.

When the NFEMI antenna 200 is proximate to a conductive structure (e.g. a structure having one or more conductive surfaces, a body, a person, an object, etc.) the magnetic and electric fields will be substantially confined to the conductive surface and not significantly radiate in free-space. This enhances security and privacy of such body networked communications.

In various example embodiments, the antenna 200 operates at or below 50 MHz (e.g. for example at 30 MHz) to ensure that the fields are following the conductive surface's contours and to ensure that far field radiation is strongly reduced.

Figure 2B:
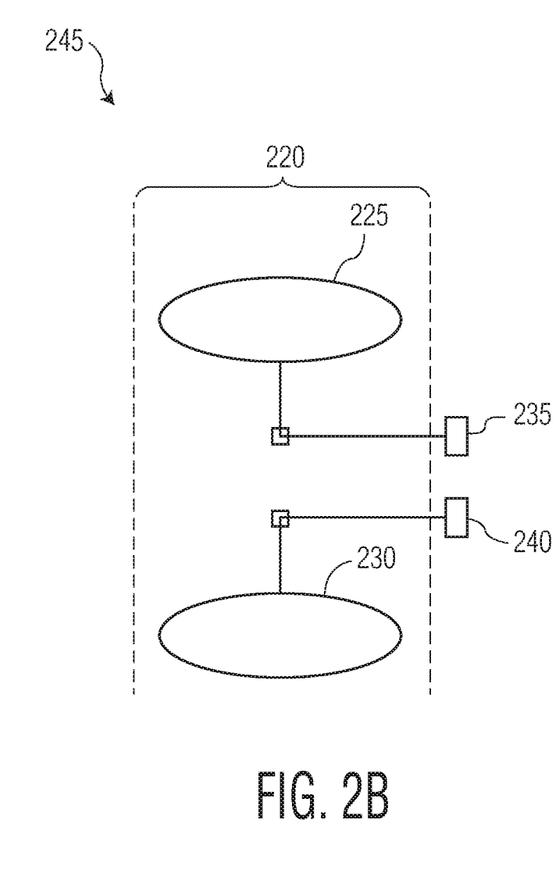
FIG. 2B is a second example near-field antenna in the wireless device.

FIG. 2B is a second example 245 near-field (e.g. near-field electro induction (NFEI)) antenna in the wireless device 100. The second example near-field antenna 245 consists of just the short loaded dipole (E-field) antenna 220 portion of the first example near-field antenna 200.

Figure 3A:
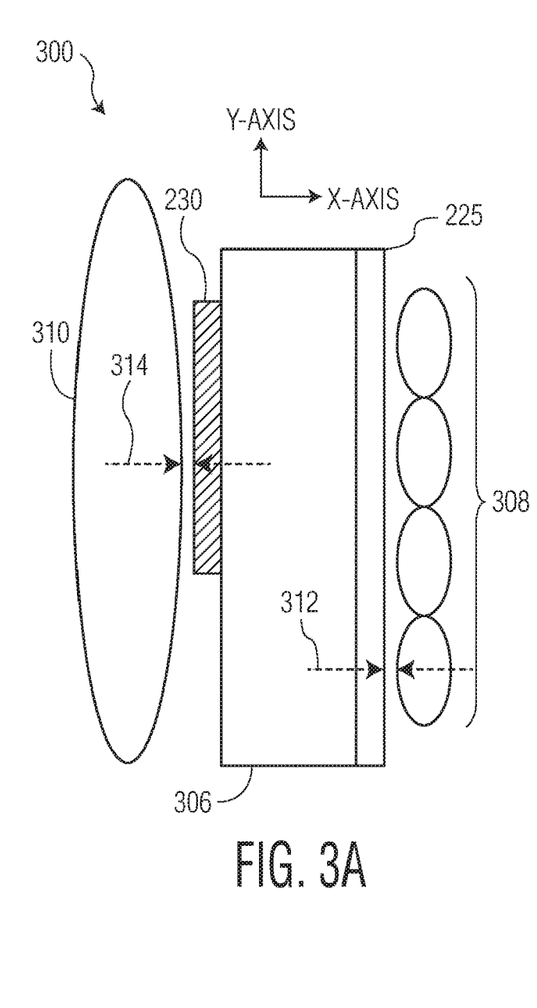
FIGS. 3A, 3B and 3C show various views of an example application of the near-field wireless device.
Figure 3B:
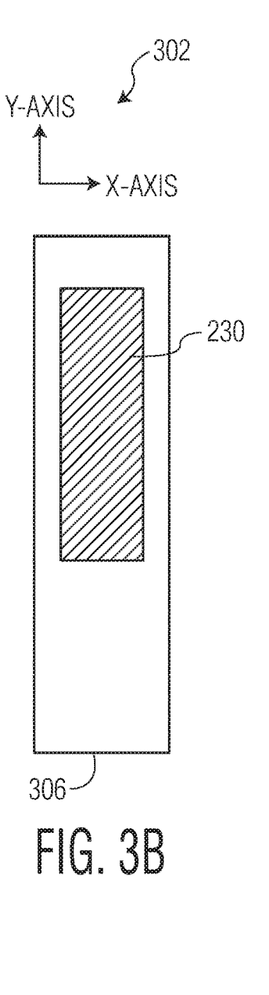
Figure 3C:
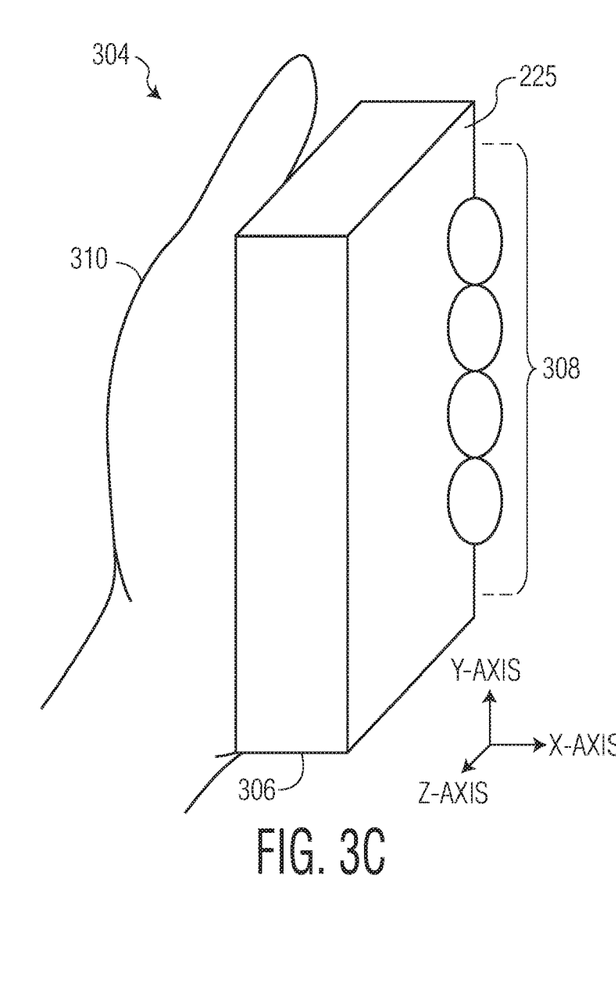

FIGS. 3A, 3B and 3C show various views 300, 302, 304 of an example application of the near-field wireless device 100. The application includes a body structure 306 housing various components of the wireless device 100, including the coil (H-field) antenna 205, the tuning circuit 104, the controller 108, and the transceiver circuit 112. The body 306 is held in a user's hand having a palm 310 region and a fingers 308 region.

The first conductive surface 225 faces the user's fingers 308 separated by a first distance (d1) 312 and thereby forming a first capacitance (Cfingers). The second conductive surface 230 faces the palm 310 of the user's hand separated by a second distance (d2) 314 forming a second capacitance (Cpalm).

By varying the body 306 thickness and placement of the conductive surfaces 225, 230, the distances d1 and d2 can be substantially set such that the quality factor (Q) of the antenna 102 can be adjusted for a desired received/transmitted signal strength (RSS/TSS) to enable robust near-field communications. In some example applications, Q will be reduced when the device 100 is enclosed by a user's hand since such biological material is placed across the conductive surfaces 225, 230.

To counteract the reduction in Q, the distances d1 and d2 can be set such that second conductive surface 230 (e.g. facing the palm of the user's hand) has a much smaller distance, d2 compared to the distance d1 of the first conductive surface 225 (e.g. facing the user's fingers). This will result in a capacitor Cfingers that is much smaller than Cpalm. Q and resonance tuning can still be aligned as required by the application due to the larger distance d1 of the first conductive surface 225 (e.g. d1=10 mm and d2=0.3 mm).

Figure 4:
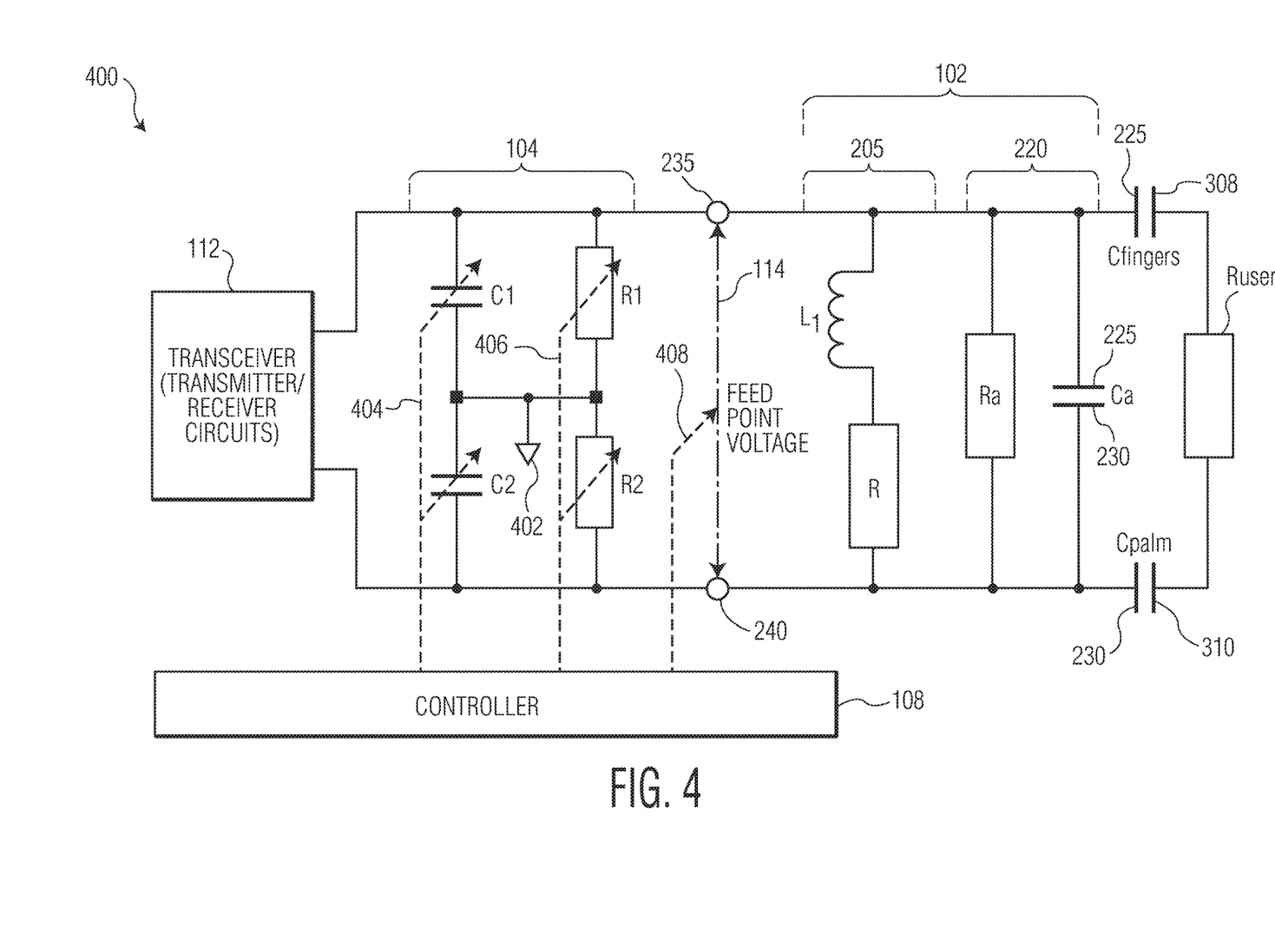
FIG. 4 is an example circuit diagram of the near-field wireless device in FIG. 1.

FIG. 4 is an example 400 circuit diagram of the near-field wireless device 100. The example circuit 400 shows an idealized electrical equivalent of the near-field antenna 102, the tuning circuit 104, the controller 108 and the transceiver circuit 112. The near-field antenna 102 includes the coil (H-field) antenna 205 and the short loaded dipole (E-field) antenna 220 having first conductive surface 225 and second conductive surface 230. Feed points 235, 240 are also shown with the feed points voltage 114 between them.

Additionally shown is the first capacitance (e.g. Cfingers) formed between the first conductive surface 225 and the user's fingers 308, as well as the second capacitance (e.g. Cpalm) formed between the second conductive surface 230 and the palm 310 of the user's hand. The user's structural (e.g. internal, tissue, etc.) resistance is represented by Ruser.

The near-field device 100 is configured to receive (e.g. in a receive mode) and/or transmit (e.g. in a transmit mode) non-propagating quasi-static near-field signals.

The example idealized antenna 102 includes the magnetic (H-field) antenna 205 having a resistance (R) and an inductance (L1), the electric (E-field) antenna 220 having a capacitance (Ca) formed between the two conductive surfaces 225, 230 and resistance (Ra), and the two feeding points 235, 240.

The tuning circuit 104 is coupled to the first and second feed points 235, 240. The tuning circuit 104 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 402 (e.g. a ground potential). The capacitive banks are coupled to the controller 108 by control line 404, the resistance banks are coupled to the controller 108 by control line 406, and the feed points voltage 114 is monitored by line 408.

The controller 108 adjusts the first and second capacitance banks (C1), (C2) to adjust a resonant frequency of the magnetic 205 and the electric 220 antennas (e.g. to 10.6 MHz). The controller 108 adjusts the first and second resistance banks (R1), (R2) to adjust a bandwidth of the magnetic 205 and the electric 220 antennas (e.g. to 400 KHz) sufficient to allow the non-propagating quasi-static near-field signal to be received from the antennas 205, 220.

In some example embodiments, the capacitance banks (C1), (C2) are equally tuned using the control line 404 from the controller 108, and the resistance banks (R1), (R2) are equally tuned using the control line 406 from the controller 108. In other example embodiments they may be unequally tuned.

In receive mode operation, the feed points voltage 114 is a result of an electric E-field inducing a voltage in the electric (E-field) antenna 220 and a magnetic H-field inducing a voltage in the magnetic (H-field) antenna 205 In transmit mode operation, the feed points voltage 114 is coupled to the antenna 102 including the electric (E-field) antenna 220 and the magnetic (H-field) antenna 205 to generate the electric and magnetic near-fields.

In some example embodiments, to reduce the wireless device's 100 own internal impedance as compared to the impedance generated based on Ruser, Cfingers and Cpalm, the wireless device's 100 variable tuning resistances (i.e. R1, R2) are kept small and at least one of the capacitors (Cfingers or Cpalm) is kept relatively small (e.g. set Cfingers as $\frac{1}{10}^{th}$ that of Cpalm).

For example, in case of a hand enclosing the device 100, d1 could be 10 mm and d2 could be 0.3 mm which results in Cfingers of 1.5 pF and Cpalm of 33 pF. Assuming a communication frequency of 10.6 MHz, the reactance is −10 kOhms and −450 Ohms for Cfingers and Cpalm respectively and Ruser can be 240 Ohms. This results in an equivalent capacitor of 1.5 pF with a series loss resistor of 240 ohms. This is relatively small compared with the combined antenna system capacitance which can be 70 pF and the combined damping resistance can be 5 kOhms.

Figure 5A:
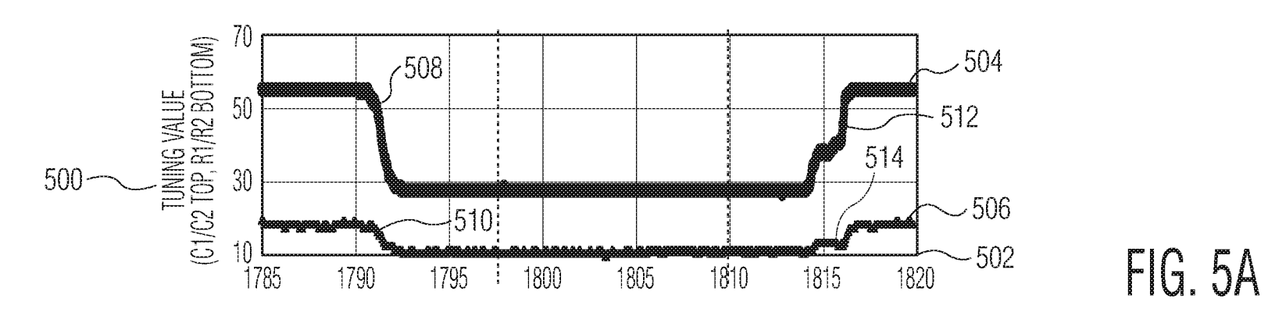
FIGS. 5A, 5B and 5C are an example set of signals corresponding to the example application of FIG. 3 as a user picks-up and puts-down example first and second wireless devices.
Figure 5B:
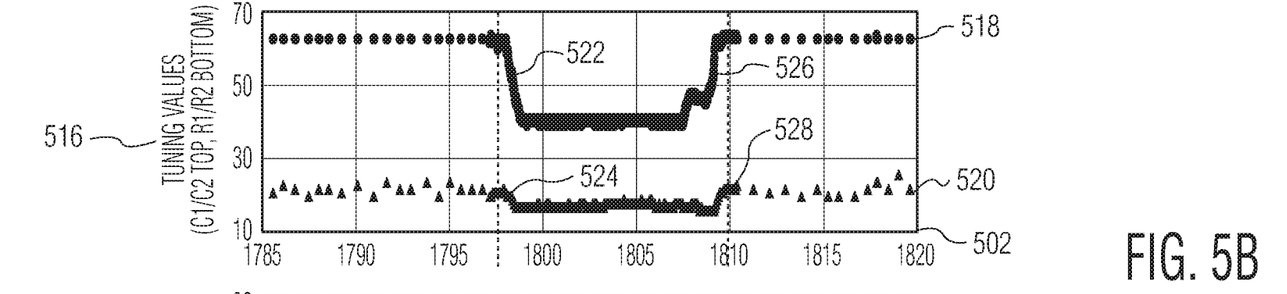
Figure 5C:
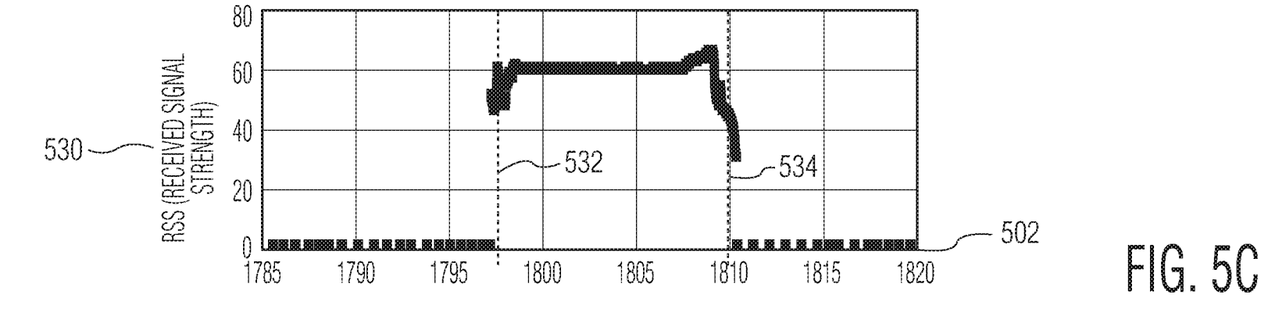

FIGS. 5A, 5B and 5C are example sets of signals corresponding to the example application of FIG. 3 as a user picks-up and puts-down example first and second wireless devices.

FIG. 5A is a first example set of tuning values 500 for the first wireless device 100 versus time 502. The first wireless device's capacitance banks (C1, C2) values 504 and resistance bank (R1, R2) values 506 are shown. These values 504, 506 can be monitored and controlled when the first wireless device is either in the receive mode or transmit mode. Note, that the wireless device 100 is monitoring the tuning values 500 in order to detect the user independently of any other wired or wireless device and without any communications link to any other device.

At approximately time 502 value of 1790 sec the user begins to grasp (e.g. pick-up) the first wireless device, which causes a corresponding decrease in both capacitive 508 and resistive 510 tuning parameter settings so as to maintain a predefined resonance frequency and/or quality factor setting.

Then at approximately time 502 value 1815 sec the user begins to release their grasp of (e.g. put-down) the first wireless device, which causes a corresponding increase in both capacitive 512 and resistive 514 tuning settings so as to maintain the predefined resonance frequency and/or quality factor settings.

FIG. 5B is a second example set of tuning values 516 for the second wireless device verse time 502. The second wireless device's capacitance banks (C1, C2) values 518 and resistance bank (R1, R2) values 520 are shown.

At approximately time 502 value of 1798 sec the user begins to grasp (e.g. pick-up) the second wireless device, which causes a corresponding decrease in both capacitive 522 and resistive 524 tuning parameter settings so as to maintain a predefined resonance frequency and/or quality factor setting.

Then at approximately time 502 value 1808 sec the user begins to release their grasp of (e.g. put-down) the second wireless device, which causes a corresponding increase in both capacitive 526 and resistive 528 tuning settings so as to maintain the predefined resonance frequency and/or quality factor settings.

FIG. 5C is an example set of received signal strength (RSS) values 530 for a near-field link between the first and second wireless devices of FIGS. 5A and 5B. At approximately time 502 value 1798 sec the user is holding both the first and second wireless devices, which results in an RSS increase 532. In this example, the RSS 532 has increased beyond 60 dBμV which in some example embodiments is sufficient for establishing a robust near-field communications link.

At approximately time value 1808 sec the user begins to release their grasp of (e.g. put-down) of the second wireless device, which results in an RSS 534 decrease. At what RSS level the near-field link would be broken with the first wireless device would depend upon the application and/or specific use context.

In some example embodiments, the near-field link is established immediately where the RSS is of a sufficient level so as to begin to initiate near-field communications between the first and second devices. However, in other example embodiments, the controller 108 may be configured to delay initiating near-field communications base on various criteria (e.g. a time delay to ensure stability of near-field communications, a beginning of a next game-play window, command to exit a battery saver mode, etc.) even though near-field communication would otherwise be possible.

Based on the above discussions, the near-field wireless device 100 does not require a near-field or any other communications link to any other device to determine that the wireless device 100 is or is not being held by a user. The near-field device 100 is instead capable of using measurements wholly internal to the near-field device 100 itself to make such a determination, well before any communications link with another game controller or other device exists.

Gaming applications where multiple gamers are present and game controllers are passed around amongst users would particularly benefit from such near-field wireless devices 100. In various example embodiments, when one user picks up such a wireless device 100 controller the user's grasping actions are detected with response times in the order of milliseconds or tens of milliseconds and so that the user can play almost instantaneously even though the user's hands are completely enclosing the wireless device 100.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field wireless device, comprising:
a near-field antenna having a first conductive surface and a second conductive surface;
wherein the conductive surfaces are configured to carry non-propagating quasi-static near-field electro-induction (NFEI) signals;
a tuning circuit coupled to the near-field antenna and having a set of tuning parameters;
a controller coupled to the tuning circuit;
wherein the controller is configured to monitor a loading of the near-field antenna;
wherein the controller is configured to adjust the tuning parameters if the loading is different from a preselected loading; and
wherein the controller is configured to set a user present status in response to a predefined threshold change in the set of tuning parameters.

2. The device of claim 1:
wherein the loading corresponds to an operational resonance frequency and/or an operational bandwidth of the near-field antenna; and
wherein the controller is configured to adjust the tuning parameters if the operational resonance frequency is different from a preselected resonance frequency and/or the operational bandwidth is different from a preselected bandwidth.

3. The device of claim 1:
wherein the tuning parameters include a capacitance or a resistance; and
wherein the controller is configured to set the user present status in response to a decrease in the capacitance and/or the resistance.

4. The device of claim 1:
wherein the tuning parameters include a capacitance or a resistance; and
wherein the controller is configured to clear or reset the user present status in response to an increase in the capacitance or the resistance.

5. The device of claim 1:
wherein the user is a person.

6. The device of claim 1:
wherein the user is at least one of: a robot, a vehicle, a docking system, a physical coupling system, or a tool or storage station on an assembly line.

7. The device of claim 1:
wherein the user present status corresponds to at least one of: the user holding the wireless device, the user grasping the wireless device, the user attaching the wireless device to their body, or the user has taken exclusive possession of the wireless device.

8. The device of claim 1:
wherein the first and second conductive surfaces are embedded in at least one of: a vehicle, a game controller, an amusement park ride, a medical device, an industrial station, or a robotic device.

9. The device of claim 1:
wherein the first and second conductive surfaces are configured to be capacitively coupled to the user.

10. The device of claim 9:
wherein a first capacitance between the first conductive surface and a first user surface is at least $\frac{1}{10}^{th}$ of a second capacitance between the second conductive surface and a second user surface.

11. The device of claim 1:
wherein the controller is configured to monitor the resonance frequency or the bandwidth when the wireless device is configured to receive the near-field signals.

12. The device of claim 1:
wherein the controller is configured to monitor the resonance frequency or the bandwidth when the wireless device is configured to transmit the near-field signals.

13. The device of claim 1:
wherein the controller is configured to set and/or reset the user present status independent from any externally received wired or wireless signal.

14. The device of claim 1:
wherein the wireless device is a gaming controller;
wherein the first conductive plate is on one side of the game controller; and
wherein the second conductive plate is on a diametrically opposite side of the game controller.

15. The device of claim 14:
wherein the first conductive plate is configured to face a palm of the user's hand; and
wherein the second conductive plate is configured to face a set of fingers of the user's hand.

16. The device of claim 1:
further comprising a second near-field device having a same set of elements as the first wireless device;
wherein the first and second wireless devices are first and second gaming devices; and
wherein the controller is configured to pair the first and second gaming devices if both devices have set the user present status.

17. The device of claim 16:
wherein the first and second wireless devices establish a near-field communications link if both devices have set the user present status.

18. The device of claim 1:
wherein the controller is configured to output an authentication signal if both the user present status and the set of tuning parameters corresponds to a stored set of tuning parameters.

19. The device of claim 18:
wherein the authentication signal at least one of: activates an electronic device, permits entry to a secure space, indicates that a procedure has been correctly followed, and/or indicates that a quality assurance procedure has been performed, and/or unlocks a user interface on a gamming device.

* * * * *